Patented Sept. 27, 1938

2,131,085

UNITED STATES PATENT OFFICE 2,131,085

BITUMINOUS CEMENT

Benjamin Albert Anderton, Grantwood, N. J., assignor to The Barrett Company, New York, N. Y., a corporation of New Jersey No Drawing. Application May 15, 1935, Serial No. 21,691

3 Claims. (Cl. 134—23.7)

This invention relates to a bituminous cement, more particularly to a bituminous cement which may be applied at atmospheric temperatures to felt base roofing to cement the overlapping and underlapping portions of the material to produce a firm and lasting bond therebetween.

One object of this invention is to provide a quick drying bituminous cement which can be applied (as for example, by brushing) throughout a wide range of temperatures, including summer and winter temperatures, to roofing and other sheet material, without heating, and will result in a firm and lasting bond between the roofing or other sheet material to which it is applied. Other objects and advantages of the invention will appear from the following description.

Heretofore in bonding one surface to another, such, for example, as in the application of bitumen-impregnated and coated felt base roofing to a roof, considerable difficulty has been experienced in obtaining a satisfactory waterproof bond between coated surfaces. Asphalts and pitches have been commonly employed as the cementing media. These are usually applied hot and set upon cooling. Hence their application involves high labor costs and the necessity for special equipment for heating. Furthermore, hot asphalts and pitches are likely to be applied too thick, particularly in cold weather. This will result in flow or bleeding of the asphalt or pitch when the thick layers are subjected to the influence of warmer weather causing a damaged and unsightly roof. Moreover, hot asphalt and pitch chill too rapidly in cold weather and frequently result in chilling or setting before complete adhesion between the roofing sheets is effected, with a consequent poor bond. Rapid cooling of the asphalt encourages hurried work, which is therefore frequently of poor quality.

The present invention provides a bituminous cement which may be satisfactorily applied cold, i. e., without preheating, which will not run or flow under the influence of summer heat, which may be readily brushed in a uniform layer over the surface to be bonded, and which dries quickly to produce a good bond between roofing and other sheet material bonded therewith.

I have found that a cement comprising a mixture of a bituminous base, solid or semi-solid at ordinary temperatures, cut-back with a suitable solvent sufficiently volatile to evaporate at atmospheric temperatures and added in amount such that the resultant blend has the consistency of a paint adapted for application by means of a brush, and containing a definite percentage of asbestos fibers, preferably long fibered asbestos, is admirably suited for cementing bitumen coated roofing, shingles and the like.

The bituminous base may consist of natural asphalt or that derived from petroleum, pitches derived from coal or water gas tar, or combinations of these with other bituminous materials such as gilsonite, grahamite and wurtzilite. Preferably asphalt having a softening point (Ring and Ball) within the range from 150° to 225° F. and a penetration at 25° C., using 100 grams for 5 seconds, of from 5 to 25 is employed as the base. (The tests for determining the softening points and penetrations of the bitumen are the standard tests of the American Society for Testing Materials. The result of the penetration test is given in tenths of a millimeter.) Instead of such asphalt, a coal tar pitch or other pitch having a softening point (Ring and Ball) within the range of 100° to 190° F. may be used.

In the case of an asphalt-base cement, a petroleum distillate is preferably employed as the solvent, the solvent being such that it will not volatilize too rapidly to cause setting of the cement before the roofing can be laid up nor will it volatilize too slowly so that a slow drying cement results. A petroleum distillate such as is known as varnish-makers' and painters' naphtha, cleaners' naphtha or safety naphtha has been found particularly adapted for cutting back asphalt base material. This distillate may be described as boiling within the range of from about 150° to about 225° C. For example, it may have the following distillation range:

| | |
|---|---:|
| Distilled off at 150° C. per cent | 0 |
| Distilled off at 160° C. do | 10 |
| Distilled off at 170° C. do | 40 |
| Distilled off at 180° C. do | 70 |
| Distilled off at 190° C. do | 89 |
| Decomposition point degrees centigrade | 204 |

The major portion of the solvent employed distills off within the temperature range of from 150 to 225° C. preferably from 160 to 190° C.

If a pitch base is used, a pitch solvent should be employed, the solvent preferably having about the same boiling range as that of the petroleum distillate hereinabove given. Such solvents will include coal-tar distillate, water gas tar distillate, drip oils, coke-oven naphthas and similar materials, having approximately the boiling range of the naphtha petroleum distillate hereinabove described. While the preferred solvents are described above, other solvents may be used to meet special conditions.

The amount of solvent added to the bitumen may vary from 35 to 50 per cent. by volume and preferably about 42 per cent. is utilized. The amount of solvent employed with an asphalt-base cement is preferably such that the cut-back product has a specific Engler viscosity falling within the range of from about 10 to about 20 at 50° C.; in warm climates a higher viscosity product e. g. up to 50 at 50° C. may be used. It is customary to report specific viscosities of such asphalt base products as the above as determined at 50° C. and specific viscosities of comparable tar-base products as determined at 25° C.; for purposes of comparison it was determined that an asphalt base product having a specific viscosity of approximately 20 at 50° C. had at 25° C. a specific viscosity of approximately 150. The amount employed with a pitch-base cement is preferably such that the cut-back product has a specific Engler viscosity falling within the range of from about 20 to 40 at 25° C. Properties of one cut-back asphalt suitable for the production of my cement have been found to be as follows:

| | |
|---|---|
| Specific gravity at 15.5° C | .936 |
| Specific viscosity (Engler) 50 cc. at 50° C | 13.6 |
| Distillation: | |
|     Distilled off at 170° C____per cent__ | 16 |
|     Distilled off at 200° C____do____ | 31 |
|     Distilled off at 235° C____do____ | 34 |
|     Distilled off at 270° C____do____ | 36 |
|     Distilled off at 300° C____do____ | 36 |
| Volatile loss—20 grams heated in a 2-ounce tin for 5 hours at 325° F____per cent__ | 38.3 |
| Softening point of residue of volatile loss test (Ring and Ball)____° F__ | 175 |
| Penetration at 25° C. of residue of volatile loss test using 100 grams for 5 seconds____ | 16 |

To the cut-back bituminous base is added from 2% to 10% by weight of asbestos fibers, the amount of asbestos within the limits stated depending on the quality of asbestos, the consistency desired for the cement, etc. Preferably a relatively long fibered asbestos, e. g., such as is classified by the Canadian Department of Mines as 7-D, is employed. For example, the asbestos may be such that in a screening test none is retained on a 4-mesh screen and approximately 31% is retained on a 10-mesh screen, the remainder passing through. A long fibered asbestos is preferred since lower percentages of the long than of the short fibered variety are required, and lower percentages of the fiber are desirable for the obtention of a cement having properties necessary for ease of brushing. Using such long fibered asbestos, from 2 to 10 per cent., preferably about 5 per cent. by weight of the asbestos, is added to the cut-back bitumen.

In making the cement the desired amount of cut-back asphalt or other bitumen produced as hereinabove described may be run into a mixer equipped for mechanical agitation. From 2% to 10%, preferably about 5%, by weight of the preferred asbestos fibers is added and the mass is thoroughly agitated until a uniform, homogeneous product results. The temperature of the cut-back asphalt is kept high enough during the mixing to permit thorough agitation but should not be so high as to cause excessive loss of the solvent. A temperature of 100° F. should not be exceeded.

The finished cement has excellent application qualities and can be readily applied to roofing at ordinary temperatures by brushing or mopping. The cement dries quickly to produce an effective bond between the superimposed or overlapping sheets. By actual test it has been found that the felt itself will tear before the cemented sheets will part at the joints. The excellent bond is due in part at least to the combined fluxing or solvent action of the cement on the bitumen coating layers of the roofing sheets and to the solid cementing layer formed upon the setting of the asbestos cut-back bitumen cement. When hot molten asphalt is employed to cement roofing, it is often difficult and sometimes impossible to effect with it a good bond between surfaces covered with soapstone flakes, talc or like non-cementitious substances. The cold, cut-back bituminous asbestos cement described above, however, penetrates layers of such non-cementitious materials as are used to prevent sticking of adjacent plies of roofing in rolls or packages, and well bonded joints result. Preferably the asphalt base cement of this invention is employed to bond asphalt coated roofing and the pitch base cement is employed with pitch coated roofing.

Since certain modifications may be resorted to without departing from the spirit of my invention, the above description should be interpreted in an illustrative and not in a limiting sense.

I claim:

1. A quick drying bituminous cement for felt roofing, said cement comprising a bituminous solution from the group consisting of (a) asphalt having a softening point falling within the range of from about 150 to about 225° F. (Ring and Ball) and a sufficient amount of petroleum distillate solvent at least the major portion of which boils within the range of from about 150 to 225° C., to produce an asphaltic solution having an Engler specific viscosity falling within the range of from about 10 to about 20 at 50° C., and (b) pitch having a softening point falling within the range of from about 100 to about 190° F. (Ring and Ball) and a sufficient amount of hydrocarbon solvent from the group consisting of coal tar distillate, water gas tar distillate, drip oil and coke oven naphtha, at least the major portion of which boils within the range of from about 150 to about 225° C. to produce a pitch solution having an Engler specific viscosity falling within the range of from about 20 to about 40 at 25° C., said cement containing from 2 to 10 per cent by weight of asbestos fibers based on the weight of the bituminous solution.

2. A quick drying bituminous cement for felt roofing, said cement comprising asphalt having a softening point falling within the range of from about 150 to about 225° F. (Ring and Ball) and having a penetration at 25° C., 100 grams, 5 seconds, of from 5 to 25 and a sufficient amount of petroleum distillate solvent, at least the major portion of which boils within the range of from about 150 to 225° C., to produce an asphalt solution having an Engler specific viscosity falling within the range of from about 10 to about 20 at 50° C., said cement containing from 2 to 10 per cent by weight of asbestos fibers based on the weight of the asphalt solution.

3. A quick drying bituminous cement for felt roofing, said cement comprising pitch of the group consisting of coal tar pitch and water gas tar pitch, having a softening point falling within the range of from about 100 to about 190° F. (Ring and Ball) and a sufficient amount of hydrocarbon solvent from the group consisting of coal tar distillate, water gas tar distillate, drip oil and coke oven naphtha, at least the major portion of which solvent boils within the range of from about 150 to about 225° C., to produce a pitch solution having an Engler specific viscosity falling within the range of from about 20 to about 40 at 25° C., said cement containing from 2 to 10 per cent by weight of asbestos fibers based on the weight of the bituminous solution.

BENJAMIN ALBERT ANDERTON.